US010837357B1

(12) United States Patent
Meckl et al.

(10) Patent No.: US 10,837,357 B1
(45) Date of Patent: Nov. 17, 2020

(54) MAIN BEARINGS OF OPPOSED-PISTON ENGINES WITH TWO CRANKSHAFTS

(71) Applicant: ACHATES POWER, INC., San Diego, CA (US)

(72) Inventors: Paul Meckl, Gresham, OR (US); Gary A. Vrsek, San Diego, CA (US); John Blacklock, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/520,146

(22) Filed: Jul. 23, 2019

(51) Int. Cl.
| | |
|---|---|
| *F16C 9/00* | (2006.01) |
| *F02B 75/28* | (2006.01) |
| *F01B 7/14* | (2006.01) |
| *F16C 9/02* | (2006.01) |
| *F16H 1/20* | (2006.01) |
| *F02F 7/00* | (2006.01) |

(52) U.S. Cl.
CPC ............... *F02B 75/28* (2013.01); *F01B 7/14* (2013.01); *F02F 7/0053* (2013.01); *F16C 9/02* (2013.01); *F16H 1/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,381,745 | A | | 8/1945 | Herreshoff et al. ............. 151/32 |
| 2,419,531 | A | * | 4/1947 | Bronander ................ F01B 7/14 |
| | | | | 123/51 BB |
| 2,468,976 | A | | 5/1949 | Herreshoff et al. ............. 123/55 |
| 4,474,148 | A | | 10/1984 | Kikuchi ........................ 123/195 |
| 4,836,159 | A | * | 6/1989 | Lobig ................... F02F 7/0053 |
| | | | | 123/195 H |
| 4,869,212 | A | * | 9/1989 | Sverdlin ................... F01B 1/12 |
| | | | | 123/51 B |
| 5,024,189 | A | | 6/1991 | Ushio et al. .................. 123/195 |
| 5,509,387 | A | | 4/1996 | Kaminski et al. ............. 123/195 |
| 5,564,837 | A | | 10/1996 | Putnam et al. ................ 384/434 |
| 6,182,619 | B1 | * | 2/2001 | Spitzer .................... F02B 25/08 |
| | | | | 123/51 B |
| 7,322,750 | B1 | * | 1/2008 | Besselman ............ F02F 7/0053 |
| | | | | 123/195 R |
| 8,789,499 | B2 | * | 7/2014 | Alonso ..................... F01B 7/14 |
| | | | | 123/51 R |
| 9,708,976 | B1 | * | 7/2017 | Warren ................. F02B 75/282 |
| 2010/0071671 | A1 | * | 3/2010 | Lemke ...................... F01B 7/14 |
| | | | | 123/51 R |

(Continued)

FOREIGN PATENT DOCUMENTS

WO     WO-2014168065 A1 * 10/2014 ................ F16C 9/02

*Primary Examiner* — George C Jin
*Assistant Examiner* — Teuta B Holbrook
(74) *Attorney, Agent, or Firm* — Terrance A. Meador; Julie J. Muyco (57) ABSTRACT

A main bearing cap construction for a dual-crankshaft, opposed-piston engine has two sets of bolts in a cross-bolted configuration. In a dual-crankshaft opposed-piston engine with at least four main bearings, at least one of the main bearings will have a cap with two sets of bolts in a cross-bolted configuration. In addition to having a cross-bolted configuration, the main bearing cap configuration can have flanges to receive blind bolts and/or additional surface area to interface with the cylinder block.

20 Claims, 11 Drawing Sheets

(56) References Cited

U.S. PATENT DOCUMENTS

| | | | |
|---|---|---|---|
| 2010/0282219 A1* | 11/2010 | Alonso | F01B 3/10 |
| | | | 123/51 AA |
| 2012/0285422 A1* | 11/2012 | Exner | F02B 75/282 |
| | | | 123/51 R |
| 2016/0032861 A1* | 2/2016 | Fuqua | F02F 1/18 |
| | | | 123/193.2 |
| 2019/0170063 A1* | 6/2019 | Alonso | F01B 7/14 |
| 2019/0211775 A1* | 7/2019 | Grebien | F02F 7/0053 |

* cited by examiner

MAIN BEARINGS OF OPPOSED-PISTON ENGINES WITH TWO CRANKSHAFTS

STATEMENT REGARDING FEDERALLY SPONSORED RESEARCH

This invention was made with government support under NAMC Project Agreement No.: 69-201502 awarded by the NATIONAL ADVANCED MOBILITY CONSORTIUM (NAMC), INC. The government has certain rights in the invention.

FIELD

The field of the invention relates to opposed-piston engine construction. More specifically, the invention relates to the construction of main bearings of an opposed-piston internal combustion engine with two crankshafts.

BACKGROUND

An opposed-piston engine with two crankshafts (also called a "dual-crankshaft" opposed-piston engine) is typically equipped with a gear train that connects the crankshafts in order to establish and maintain synchronization of piston movement and gas transport. Forces on engine components in a dual-crankshaft opposed-piston engine in which the crankshafts are connected by a gear train may be such that one portion of the engine experiences more unbalanced forces than another, as well as differing directions of forces, during operation. An example of this difference in forces experienced in a dual-crankshaft opposed-piston engine would be greater force exerted on the main bearings nearest the gear train than on the main bearings located further away. To construct a dual-crankshaft opposed-piston engine as described herein that is robust, main bearing constructions are needed that can accommodate forces of different magnitude and direction.

SUMMARY

A main bearing configuration for a dual-crankshaft opposed-piston engine that includes features for adapting to forces unique to such an opposed-piston engine is shown and described herein. The main bearing structure can include added material and areas for contact between the main bearing cap and the cylinder block, as well as for a main bearing cap with fasteners disposed in a cross-bolted configuration.

The use of one or more main bearing caps that include fasteners in a cross-bolted configuration may be influenced by a determination that forces acting on the main bearing can be more effectively counteracted by the addition of cross-bolts. In dual-crankshaft opposed-piston engines hi which the crankshafts are connected by a gear train, the determination of the direction and magnitude of forces on each of the main bearings may require a different main bearing cap configurations depending on location of the cap in the engine.

DETAILED DESCRIPTION OF THE PREFERRED EMBODIMENTS

An internal combustion, opposed-piston engine with two crankshafts can have a distribution of forces that may require more than one type of main bearing cap configuration. That is to say, main bearings in different parts of the engine may require different types of constructions. Presented herein are exemplary configurations for main bearings in an opposed-piston engine, as well as methods for determining the location and use of these main bearings in an opposed-piston engine.

Figure 1:
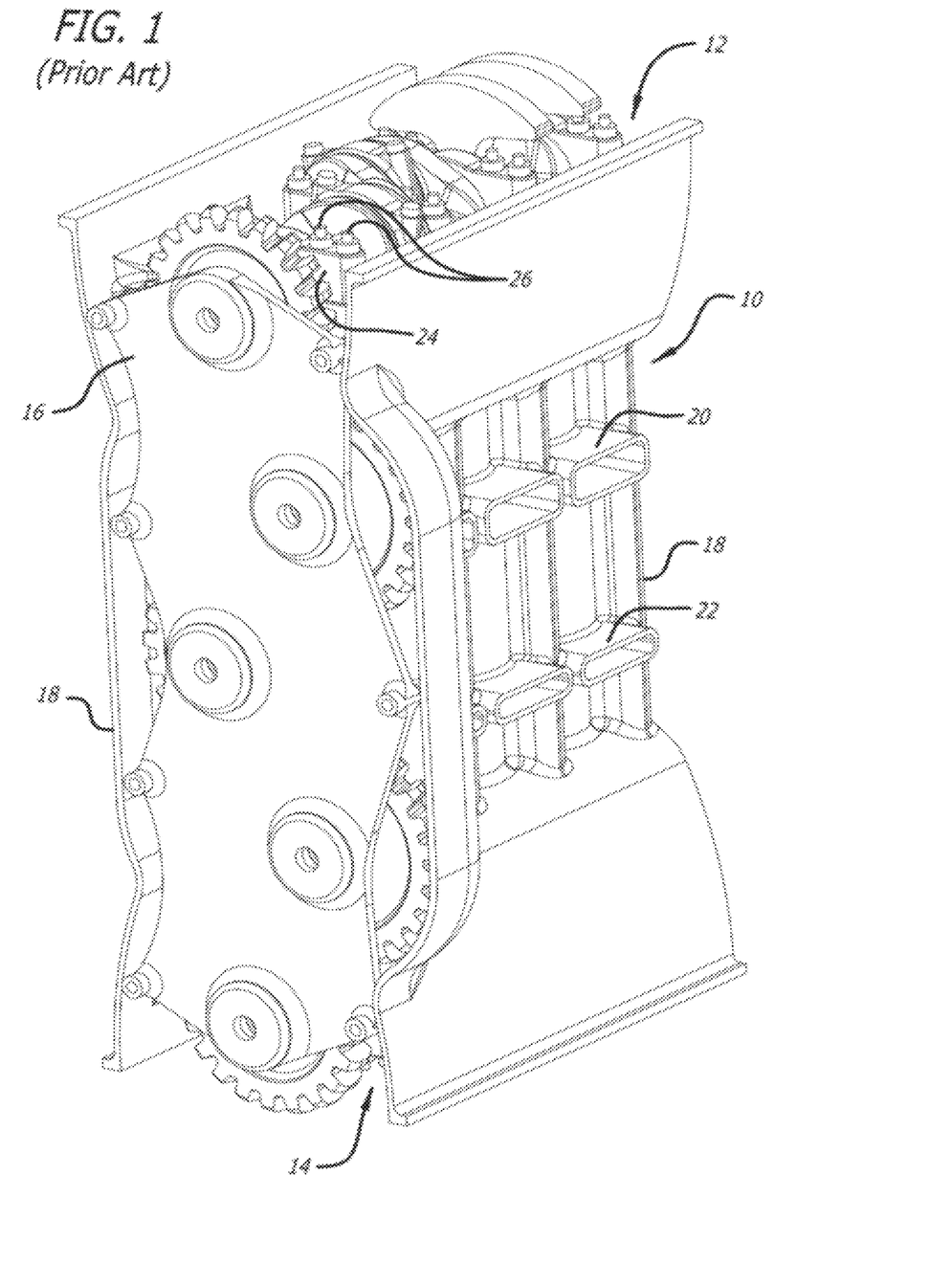
FIG. 1 is an isometric view of a dual-crankshaft, opposed-piston, internal combustion engine, partially disassembled, and is properly labeled "Prior Art".

FIG. 1 illustrates a prior art arrangement comprising a partially constructed dual-crankshaft, opposed-piston, internal combustion engine 10 with two crankshafts designated as a first crankshaft 12 and a second crankshaft 14. An end panel 16 supports a gear train that connects the crankshafts to establish and maintain synchronization therebetween. Side panels 18 include exhaust and intake channels 20 and 22 that communicate with exhaust and intake ports of one or more cylinders. Main bearing caps 24 and bolts 26 secure the crankshafts in place.

Figure 2A:
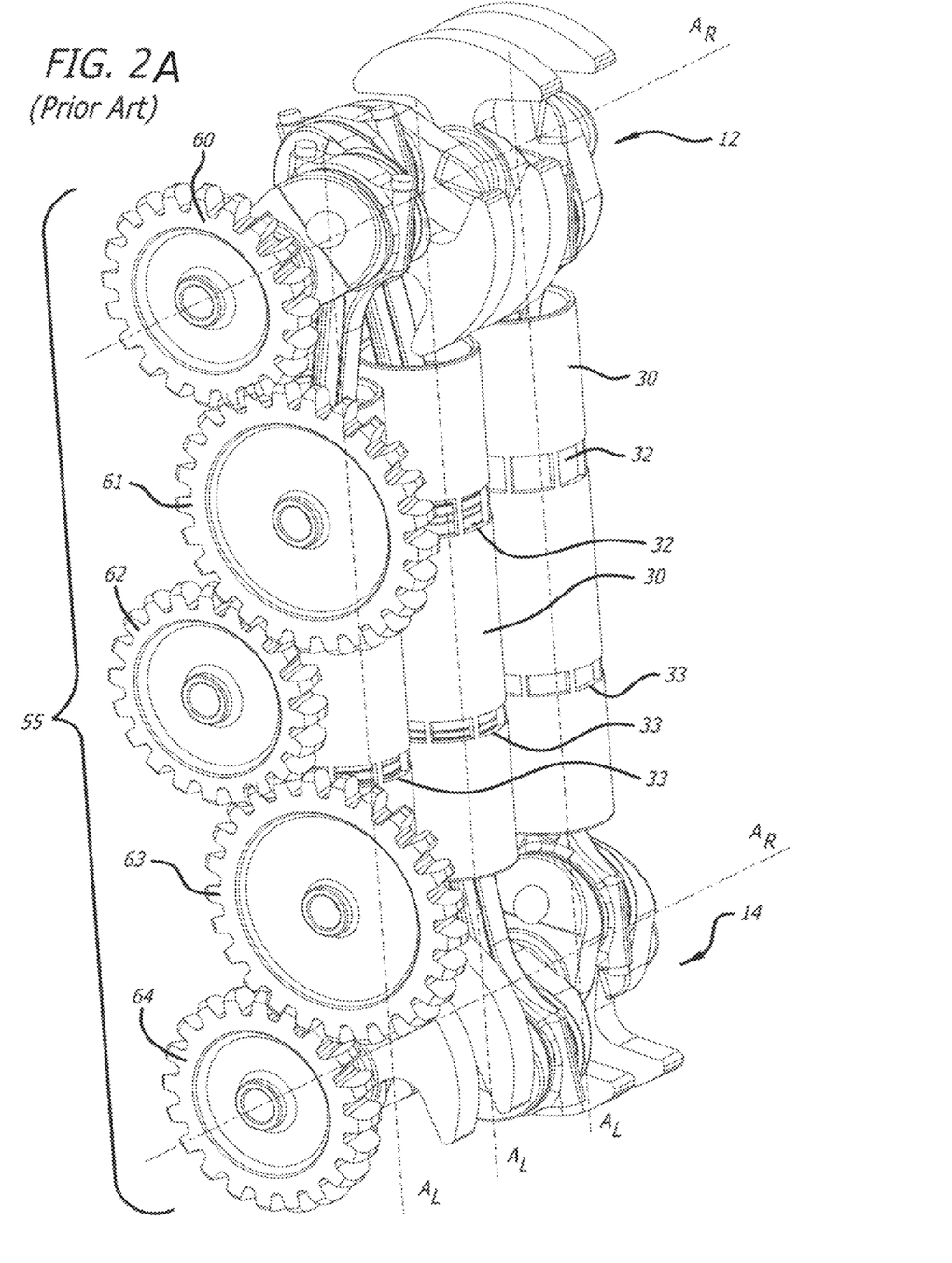
FIG. 2A is an isometric view of the opposed-piston engine of FIG. 1, with casing parts removed to show ported cylinders, and is properly labeled "Prior Art"
Figure 2B:
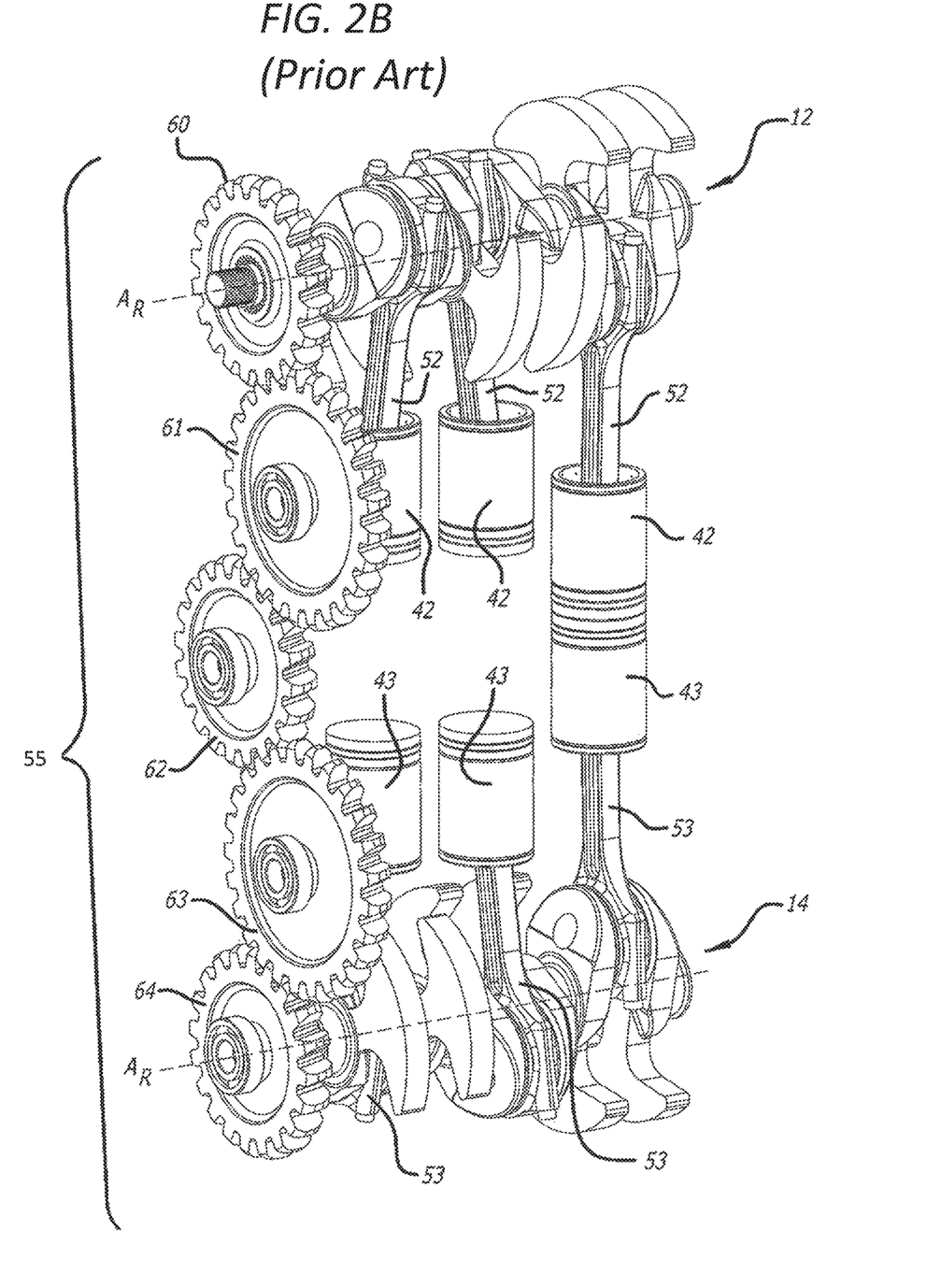
FIG. 2B is an isometric view of the opposed-piston engine of FIG. 2A, with cylinder walls removed to show ported cylinders with pistons, and is properly labeled "Prior Art".

Referring to FIGS. 2A and 2B, the engine 10 includes one or more ported cylinders 30. For example, the engine can include one, two, three, or more cylinders. In any event, the cylinder 30 represents both single cylinder and multi-cylinder configurations of the opposed-piston engine 10. Each cylinder 30 has a longitudinal axis $A_L$ and exhaust and intake ports 32 and 33. The cylinders 30 are juxtaposed and oriented with exhaust and intake ports mutually aligned. The crankshafts 12 and 14 are disposed in a spaced-apart relationship, with parallel axes of rotation $A_R$. In the example shown, the crankshafts are rotatably mounted at respective exhaust and intake ends of the cylinders 30. (In such instances, which are intended to apply throughout this specification, the crankshafts 12 and 14, and corresponding crankshafts to be described, may be respectively designated as an exhaust crankshaft and an intake crankshaft.) The cylinders 30 are disposed in an inline array, in which their longitudinal axes $A_L$ are parallel and generally contained in a plane that intersects the cylinders 30 and contains the parallel axes $A_R$ of the crankshafts 12 and 14. A pair of pistons 42, 43 is disposed for opposed sliding movement of the pistons in the bore of each cylinder 30. All of the pistons 42 controlling the exhaust ports 32 are coupled by connecting rods 52 to respective cranks of the exhaust crankshaft 12; all of the pistons 43 controlling the intake ports 33 are coupled by connecting rods 53 to respective cranks of the intake crankshaft 14. The crankshafts 12 and 14 are connected by a gear train 55 that includes the gears 60-64. In some aspects, each of the cranks on the exhaust crankshaft 12 can lead a corresponding crank of the intake crankshaft 14 by a predetermined angle $\emptyset$; this predetermined amount of difference is known as crank lead.

The gear train 55 that connects crankshafts 12 and 14 in FIGS. 2A and 2B not only maintains the amount that the exhaust crankshaft 12 leads the intake crankshaft (e.g., maintains the relative crank positions), but it transmits energy from one crankshaft to the other. For example, in the case where driving power is taken from the exhaust crankshaft 12, any power not used to run auxiliary devices on the intake crankshaft 14 is transmitted through the gear train 55 to the exhaust crankshaft 12.

Figure 3:
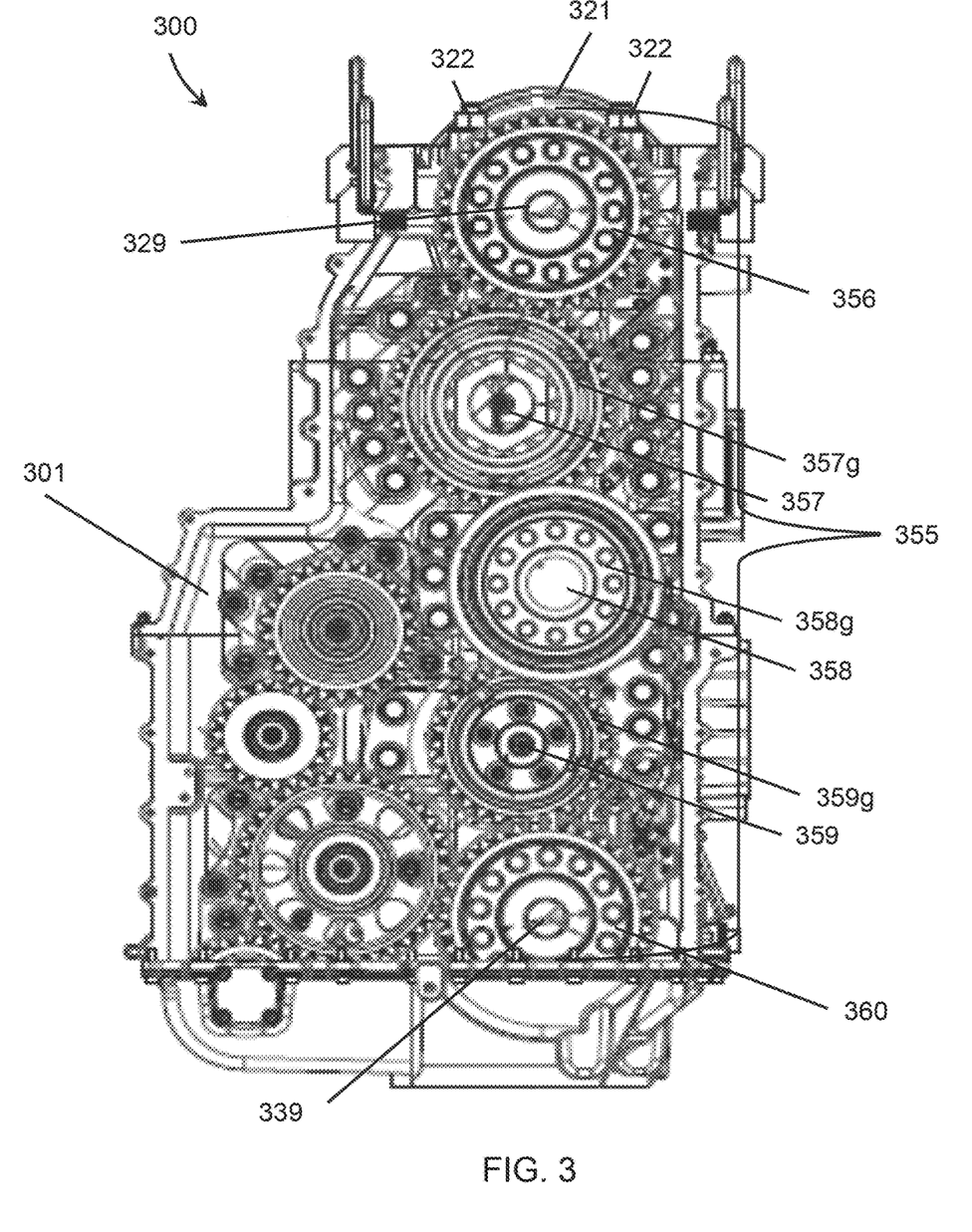
FIG. 3 shows an elevation view of a side of a dual-crankshaft opposed-piston engine where a gear train is supported.

FIG. 3 is an elevation view of a dual-crankshaft, opposed-piston engine 300 showing a gear train 355. The engine 300 includes a cylinder block 301; the gear train 355, a cylinder (not visible in this view), an exhaust crankshaft 329, an intake crankshaft 339, and a main bearing cap 321 secured to the cylinder block 301 by at least two bolts 322. The gear train 355, as shown in FIG. 3, includes a plurality of gears connecting an end of the exhaust crankshaft 329 with an end of the intake crankshaft 339; in this example, which is not meant to be limiting as to any particular number of gears, the gear train 355 comprises five gears. The gears of the gear train include a crank gear 356 mounted to an end of the exhaust crankshaft 329, a first idler gear 357g on first idler post 357, a power take off gear 358g on a power take off shaft 358, a second idler gear 359g on a second idler post 359, and a crank gear 360 mounted to an end of the intake crankshaft 339. The idler posts are formed on a face of the cylinder block 301.

Figure 4A:
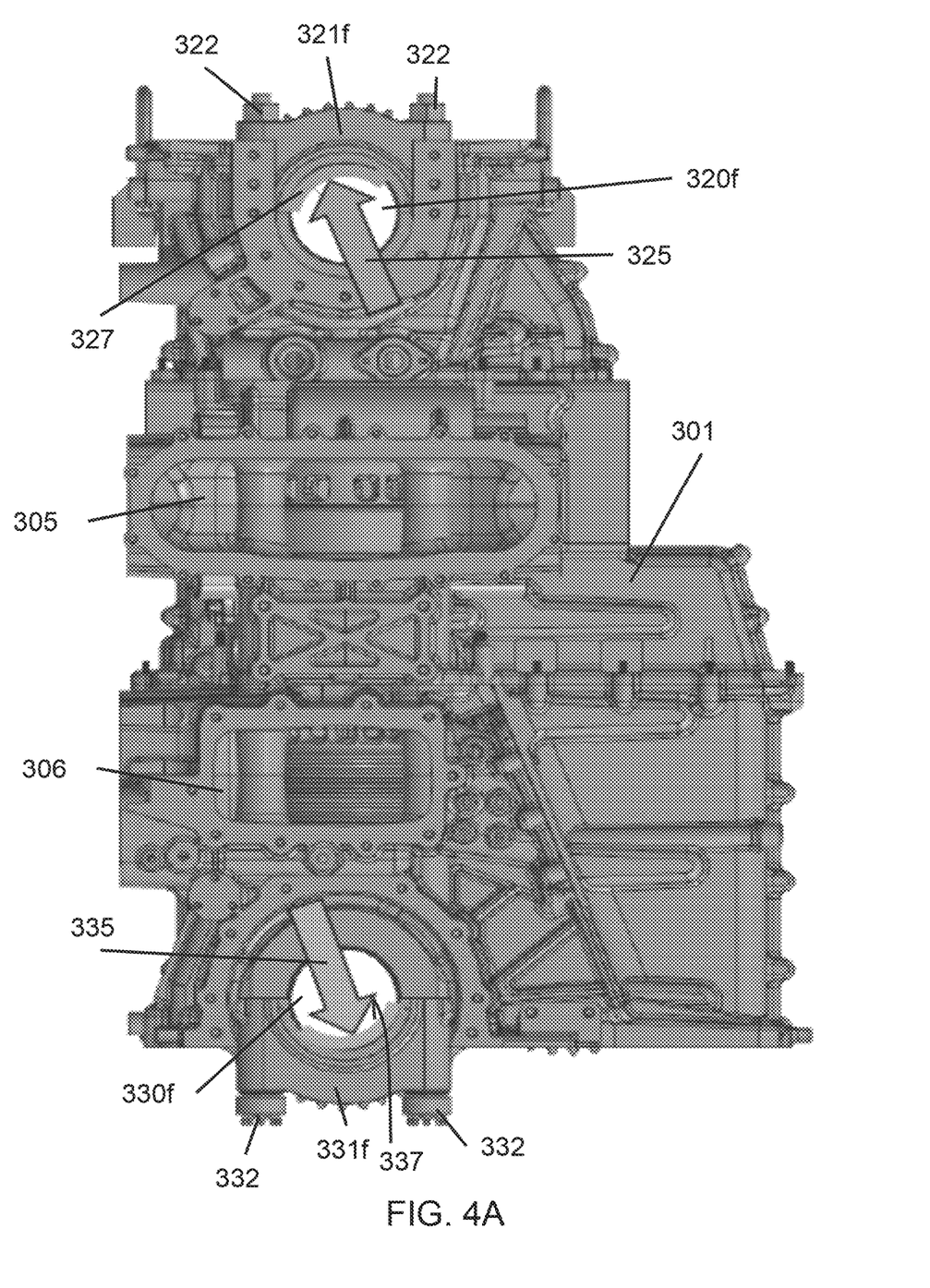
FIG. 4A shows exemplary combustion forces and FIG. 4B shows exemplary gear train forces for a dual-crankshaft opposed-piston engine, such as can be used to indicate where main bearing cap configurations as described herein may be located.
Figure 4B:
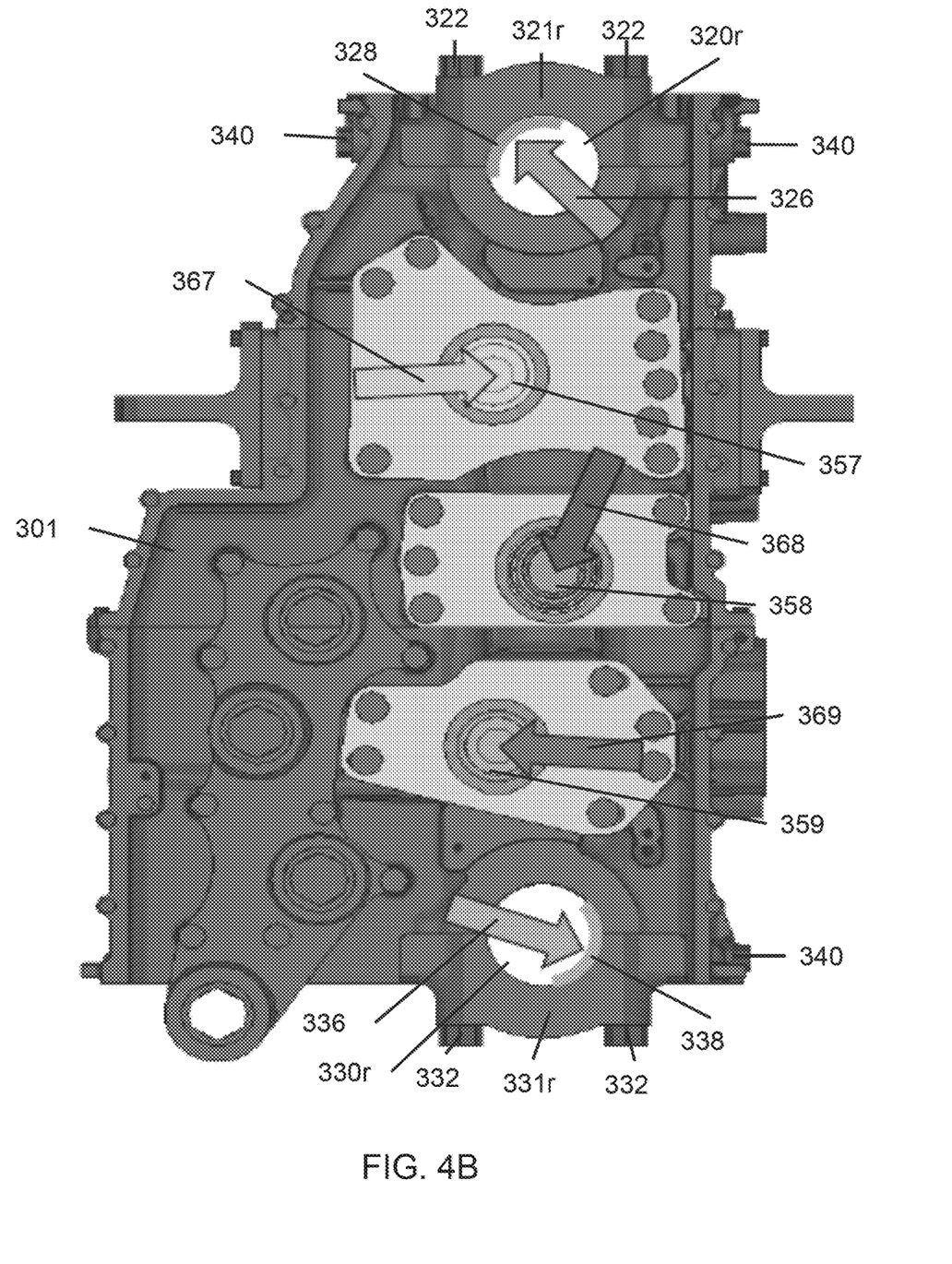
Figure 5:
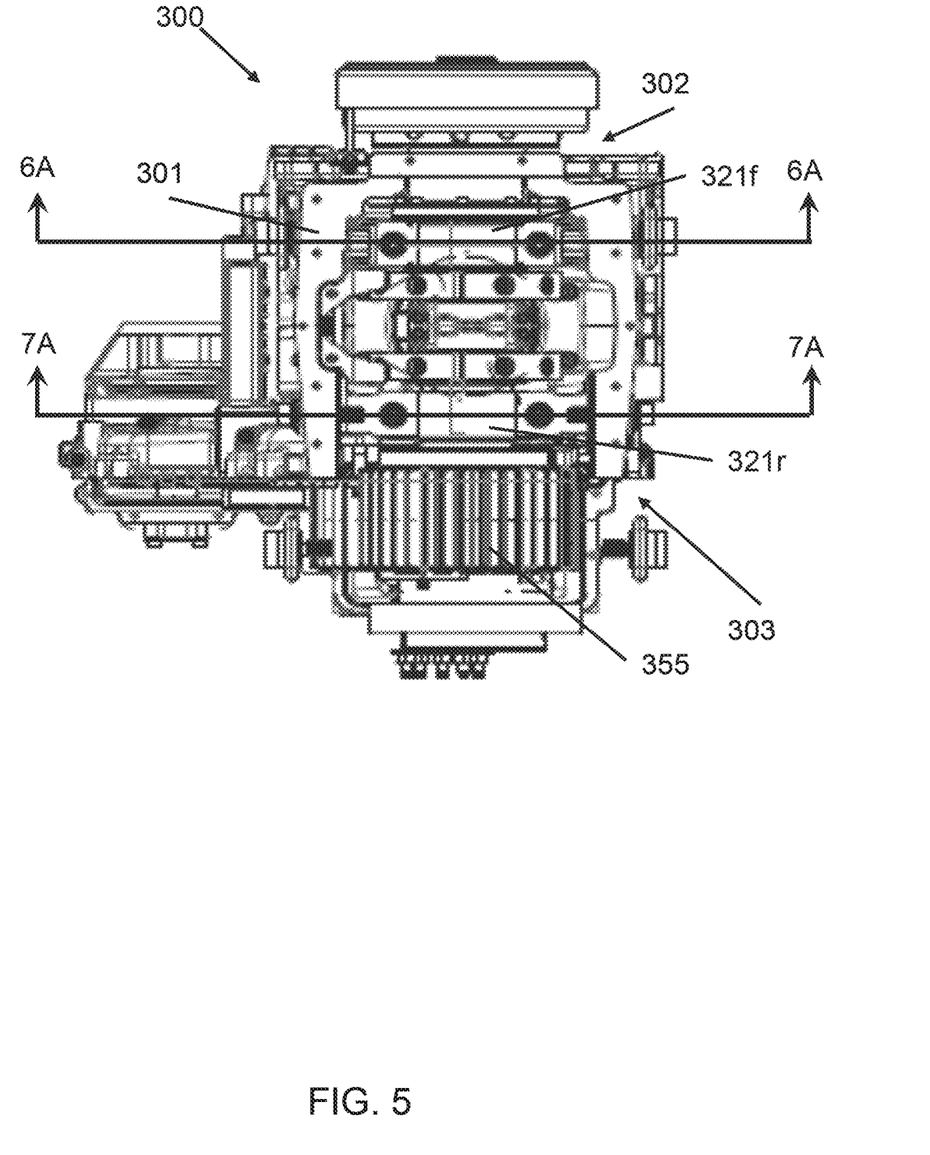
FIG. 5 is a plan view of an exhaust end of a dual crank opposed-piston engine showing two main bearing caps.

FIGS. 4A and 4B include exemplary force vectors that indicate why a main bearing cap configuration with four bolts in a cross-bolted configuration may be needed in a dual-crankshaft opposed-piston engine. Referring to FIGS. 4A and 5, a front view (FIG. 4A) of the engine 300 is shown that is taken adjacent to main bearing caps 321f, 331f near a face 302 of the cylinder block 301 that is opposite the face 303 on which the idler posts are formed. For convenience alone, and without intent to limit the description to any particular orientation of the engine, the face 302 is designated as the front face of the cylinder block, and the opposing face 303 (where the idler posts are formed) is designated as the rear face of the cylinder block. As per FIG. 3, the gear train 355 is supported on the rear face 303 of the cylinder block 301. In FIG. 4A, the cylinder block 301 is sectioned to show an exhaust plenum 305, and intake plenum 306, an exhaust main bearing 320f which receives an end of the exhaust crankshaft 329, an intake main bearing 330f which receives an end of the intake crankshaft 339, an exhaust main bearing cap 321f which retains the exhaust crankshaft in the exhaust bearing 320f, an intake main bearing cap 331f retains the intake crankshaft in the intake bearing 330f, and respective pairs of bolts 322 and 332 that attach and secure the main bearing caps 321f, 331f to the cylinder block 301. The main bearings can be journal bearings, in which oil or another fluid maintains a separation between each crankshaft and its bearings; alternatively each main bearing can be a plain bearing such that there is contact between each crankshaft and its bearing. Each main bearing includes a cap and a cylinder block portion, such that each main bearing surface includes portions defined by the bearing cap and portions from the cylinder block. In the exhaust main bearing 320f, there is a portion of the bearing surface 327 on which force 325 is exerted when the engine is in use. Similarly, the intake main bearing 330f has a portion of its bearing surface 337 on which force 335 is exerted when the engine is in use. As shown in FIG. 4A, the force 325 acting on the exhaust bearing 320f acts largely on a portion of the bearing surface 327 that is formed by the exhaust main bearing cap 321f. This force 325 is opposite in direction of the force 335 that is acting on the intake main bearing 330f. The forces 327, 337 that act on the main bearings 320f, 330f when the engine is in use are sufficiently countered by the bolts 322, 332 that hold the main bearing caps 321f, 331f to the cylinder block 301.

FIG. 4B shows a cross-sectional view of the single cylinder opposed-piston engine shown in FIG. 4A. With reference to FIGS. 4B and 5, the cross-section is taken adjacent to the exhaust and intake main bearing caps 321r, 331r closest to the gear train (i.e., near the rear face 303 of the cylinder block). Like the cross-section shown in FIG. 4A, FIG. 4B shows the cylinder block 301; an exhaust main bearing 320r which receives a bearing journal of the exhaust crankshaft 329; an intake main bearing 330r which receives a bearing journal of the intake crankshaft 339; an exhaust main bearing cap 321r which retains the exhaust crankshaft journal in the exhaust bearing 320r, an intake main bearing cap 331r retains the intake crankshaft journal in the intake bearing 330r. A pair of threaded bolts 322 that secure the main bearing cap 321r to the cylinder block 301 are inserted parallel to the longitudinal axis of the cylinder in the engine. A pair of threaded bolts 332 that secure the main bearing cap 331r to the cylinder block 301 are inserted parallel to the longitudinal axis of the cylinder in the engine. As per FIG. 4B, a force 326 acts on a portion 328 of the exhaust crankshaft bearing surface; and a force 336 acts on a portion 338 of the intake crankshaft bearing surface. Additionally, FIG. 4B shows the two idler posts 357, 359 and the power take-off shaft 358, as well as the forces acting on those engine components. The force 367 acting on the idler post 357, the idler post closest to the exhaust crankshaft, acts in a direction generally opposite to that of the force 369 acting on the second idler post 359, the idler post closest to the intake crankshaft. The magnitude of the force 367 on the first idler post 357 is generally the same order of magnitude as that of the farce 369 on the second idler post 359. In some implementations, the forces 367, 369 can have maximum values within 50 to 60 Newtons (N) of each other. FIG. 4B also shows the power take-off shaft 358 and the force 368 acting on the shaft. The force 368 acts generally in a direction along the longitudinal axis of the engine, from the exhaust crankshaft 329 towards the intake crankshaft 339. The maximum value of the force 368 acting on the power take-off shaft 358 can be on the same order of magnitude, yet less than, the forces 367, 369 acting on the first and second idler posts.

The forces 326, 336 that act on the main bearings 320r. 330r during operation of the engine shown in FIG. 4B act in generally opposite directions. On the exhaust main bearing 320r, the force 326 that acts on the bearing during engine operation acts on a portion of the bearing surface 328 that is an approximately 120° arc that spans the main bearing cap 321r and the cylinder block 301. Similarly, on the intake main bearing 330r, the force 336 that acts on the main bearing 330r during engine operation acts on a portion of the bearing surface 338 that is an arc spanning the main bearing cap 331r and the cylinder block 301 that covers about 120°. The configuration of main bearing caps shown in FIG. 4B includes cross-bolts 340 that are positioned substantially perpendicular to the bolts 322, 332. This configuration of main bearing cap, including cross-bolts, counteracts the portions of the forces that act transverse to the longitudinal length of the engine.

FIG. 5 is a top-down view of the dual-crankshaft opposed-piston engine 300, toward an exhaust end, showing two main bearing caps 321f and 321r. The view indicates the front face 302 of the cylinder block 301, and the rear face 303 of the cylinder block 301 with the gear train 355 supported on the rear face 303. The main bearing cap 321r of the main bearing nearest the gear train 355 can be seen to have a different configuration to that of the main bearing cap 321f, which is further from the gear train 355 than main bearing cap 321r. This difference is clearly illustrated in FIG. 6A and FIG. 7A, which are cross-sections of the engine shown in FIG. 5.

Figure 6A:
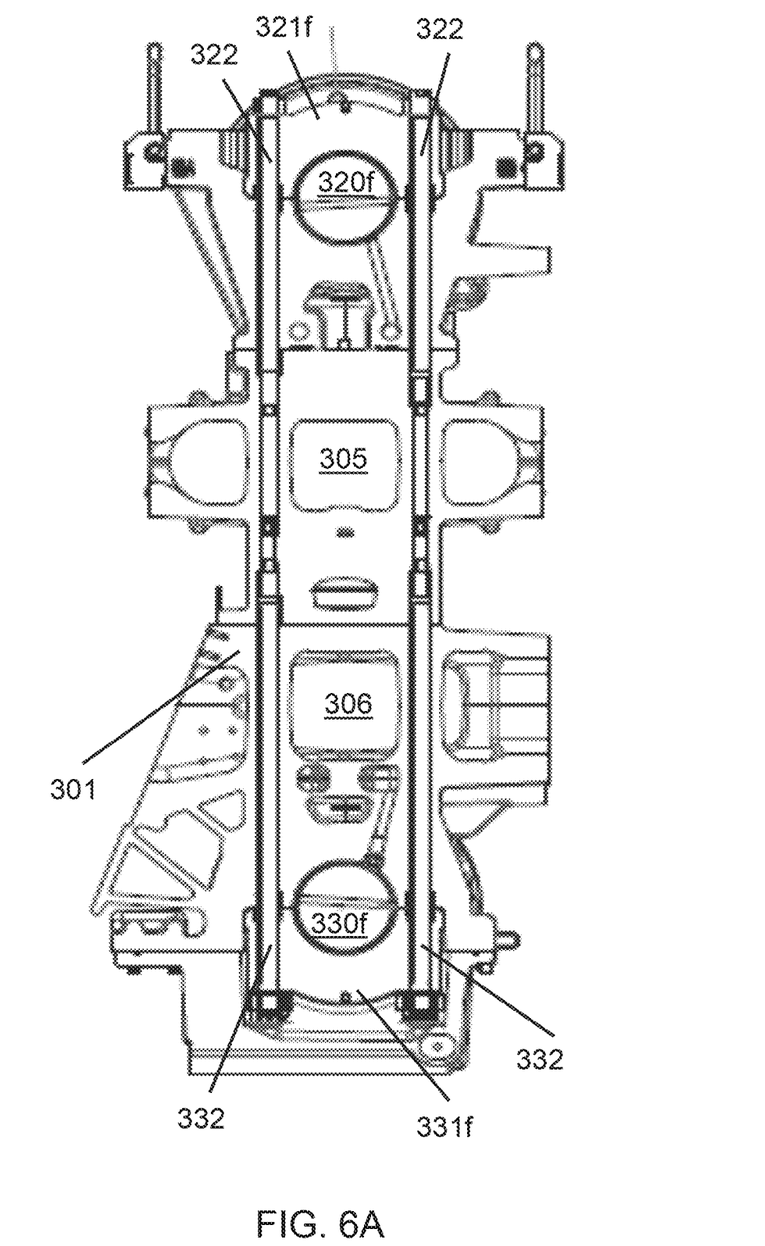
FIG. 6A shows cross-sectional view of the engine of FIG. 5, with the section taken through a main bearing cap furthest away from the engine's gear train.
Figure 6B:
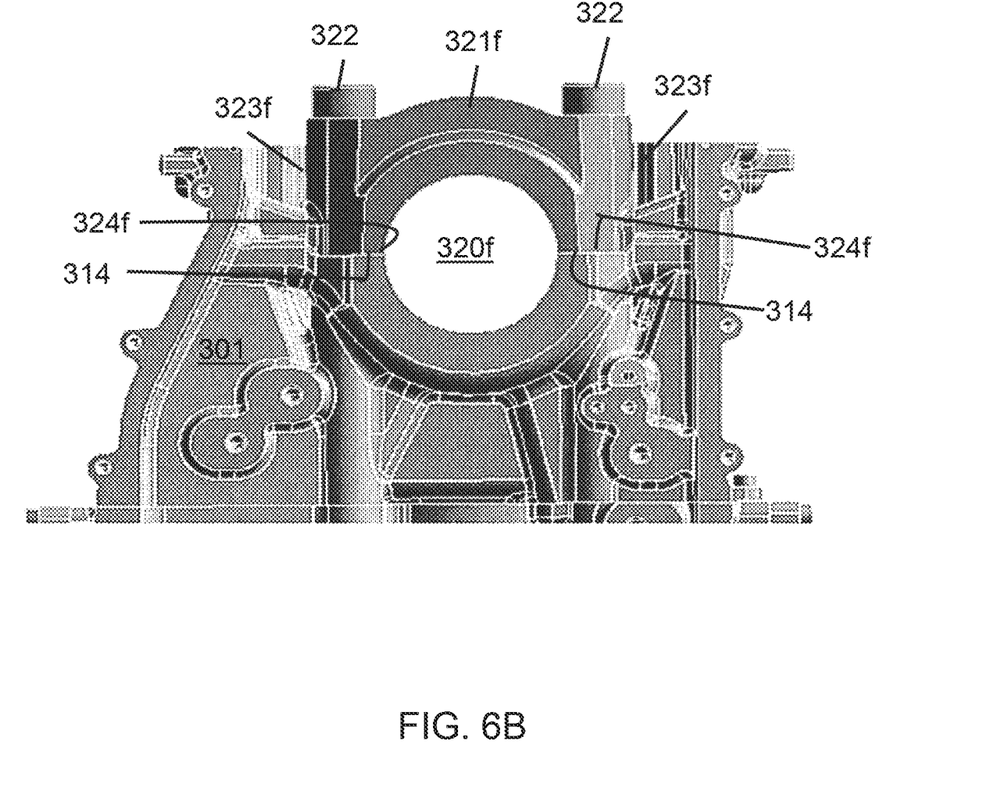
FIG. 6B is an enlarged view of the exhaust end main bearing cap shown in FIG. 6A.

In some opposed-piston engines, main bearing caps are secured to the cylinder block by threaded bolts that are inserted through openings that traverse the depth of each cap on either side of a cylinder, and are seated in the cylinder block. FIGS. 6A and 6B show this type of main bearing cap, with two bolts seated in the cylinder block.

FIG. 6A shows a cross-sectional view of the engine 300 of FIGS. 3 and 5, with the section taken through the main bearing cap 321f of the main bearing 320f which is furthest away from the engine's gear train 355. In the cross-section, the cylinder block 301 is shown with portions of the exhaust plenum 305 (e.g., exhaust chest) and intake plenum 306 (e.g., intake chest) visible, as well as the correspondingly-located exhaust end main bearing 320f and the intake end main bearing 330f. The main bearing caps 321f, 331f, as well as the connecting bolts 322, 332 which secure the main bearing caps 321f and 331f, respectively, to the cylinder block 301, are visible in FIG. 6A. The bolts 322, 332 can be through bolts that traverse the entire cylinder block 301 or blind bolts that enter the intake end and/or exhaust end of the cylinder block and terminate inside the cylinder block.

FIG. 6B shows an enlarged view of the exhaust main bearing 320f near the front face of the cylinder block 301. The main bearing cap 321f of the exhaust main bearing 320f comprises an arched beam that joins laterally-disposed ends with respective openings on either side of the bearing opening into which threaded bolts 322 are fitted and secured in an exhaust end of the cylinder block 301. The sides 323f of the main bearing cap 321f are substantially flat and straight, so as to be parallel to each other. The bottom portions 324f of the main bearing cap 321f that meet with an interfacing surface 314 on the cylinder block are flat, so that the sides 323f are perpendicular to a plane that contains the bottom portions 324f of the main bearing cap 321f. There is a tight fit between the main bearing cap 321f and the cylinder block to minimize lateral movement. As seen in FIG. 6A, the structure of the main bearing cap 331f of the intake crankshaft comprises the same elements as described for the main bearing cap 321f.

Figure 7A:
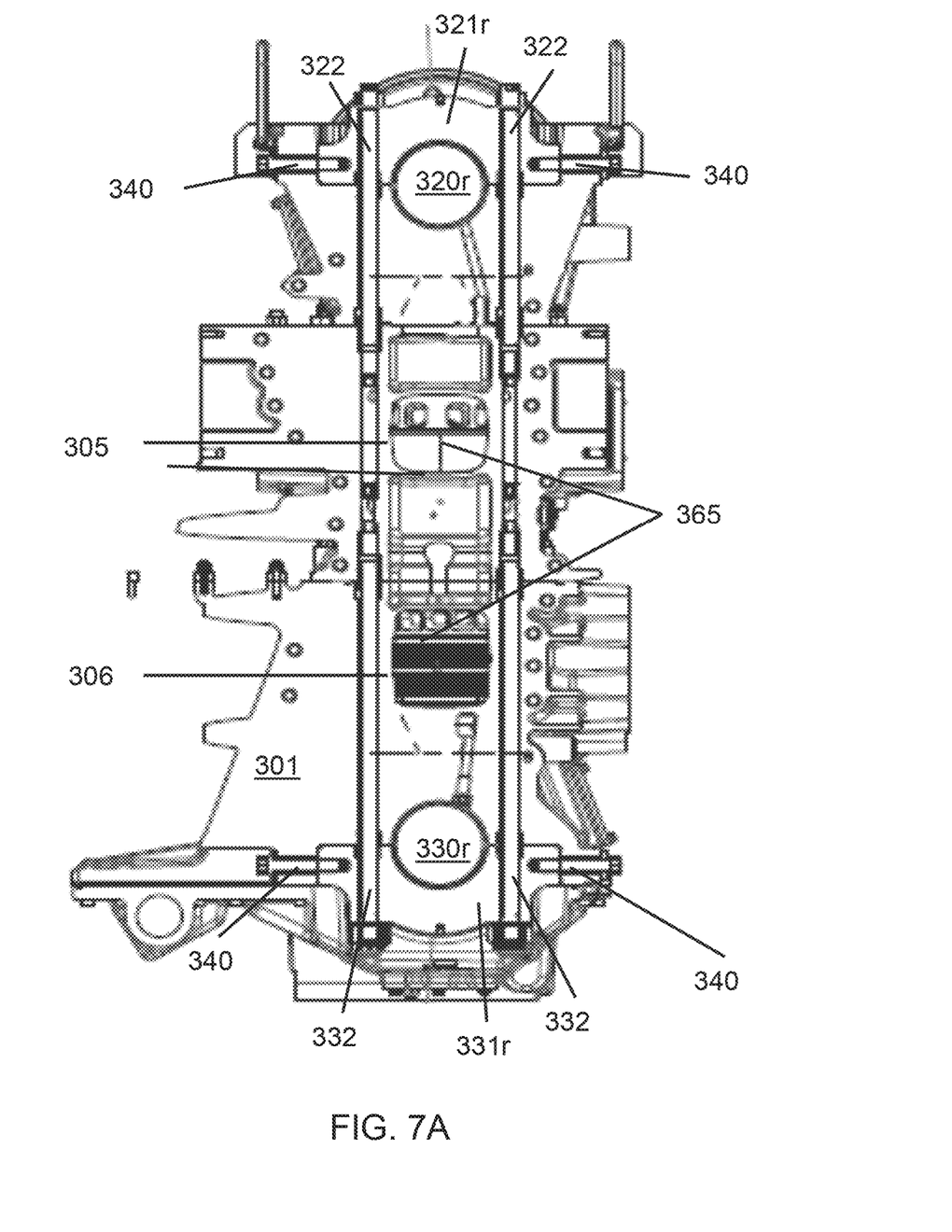
FIG. 7A shows cross-sectional view of the engine of FIG. 5, with the section taken through the main bearing cap closest to the engine's gear train.

FIG. 7A shows cross-sectional view of the engine of FIG. 5, with the section taken through the main bearing caps closest to the engine's gear train. In FIG. 7A, the cylinder block 301 is shown with the cylinder 365 seen through portions of the intake 306 and exhaust 305 plenums. The exhaust crankshaft bearing 320r and intake crankshaft bearing 330r are each capped by a main bearing cap 321r, 331r. The configuration of the main bearing caps 321r, 331r shown in FIG. 7A include bolts 322, 332 and cross-bolts 340. The bolts 322, 332 can be through bolts that traverse the entire cylinder block 301 or blind bolts that enter the intake end and/or exhaust end of the cylinder block and terminate inside the cylinder block, while the cross-bolts 340 are preferably blind bolts, as shown in FIG. 7A.

Figure 7B:
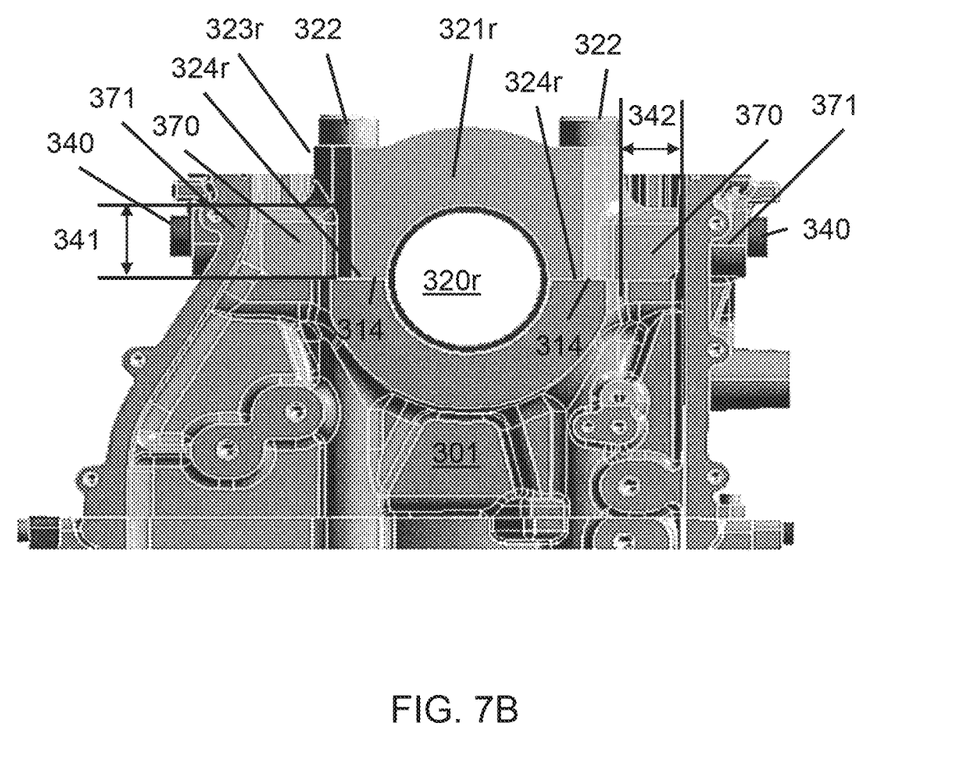
FIG. 7B is an enlarged view of the exhaust end main bearing cap of shown in FIG. 7A.

FIG. 7B shows an enlarged view of the exhaust main bearing 320r that is nearest the gear train. The main bearing cap 321r of the exhaust main bearing 320r comprises an arched beam that joins laterally-disposed ends with respective openings on either side of the bearing opening into which threaded bolts 322 are fitted and secured in an exhaust end of the cylinder block 301 in a direction parallel to the longitudinal axis of an adjacent engine cylinder (365 in FIG. 7A). In addition, flanges 370 extend outwardly from the laterally-disposed ends of the arched beam. A second pair of bolts 340 that are secured in a direction that is perpendicular to both the longitudinal axis of the adjacent crankshaft and an adjacent engine cylinder in an assembled opposed-piston engine. The main bearing cap 321r shown in FIG. 7B differs from that shown in FIG. 6B in that the main bearing cap 321r can accommodate cross bolts 340. In FIG. 7B, the sides 323r of the main bearing cap 321r have protruding portions 370 (e.g., side flanges) that accommodate the cross bolts 340. Each bolt in the second pair of bolts 340 pass through portions of the cylinder block 371 (e.g., bolt openings) into the protruding portions 370 of the main bearing cap 321r. The bolts 340 used in this cross-bolting position are blind bolts. The protruding portions 370 are at the bottom of each main bearing cap 321r, forming part of the interface surface 324r of the main bearing cap 321r with the cylinder block. These protruding portions 370 not only add mass to each main bearing cap 321r for the cross bolts 340 to attach to, but also add more surface area for each cap 321r to interface with the cylinder block 301.

The main bearing cap 321r shown in FIG. 7B is symmetric such that each of the protruding portions 370 have a height 341 and a width 342. The height 341 is sufficient to accommodate the height of the cross bolt 340 and any threads needed for fitting the cross bolt securely to the main bearing cap 321r, as well as providing at least as much mass is needed to counteract the maximum forces that may act on the main bearing cap when the engine is in use. The width 342 of the protruding portions 370 can accommodate at least a length of cross bolt 340 corresponding to an adequate number of threads to achieve appropriate clamp load on the bolt 340 so that the main bearing cap 321r can attach to the cylinder block 301 such that the cross bolts 340 do not come free or pull out of their locations while the engine is in use. The interface surface 324r on the main bearing cap 321r on either side of the bearing surface is greater than that of the main bearing cap 321f shown in FIG. 6B by the width 342 of the protruding portion 370. Thus, there is a greater interfacing surface 314 on the cylinder block 301 to complement the overall interface surface 324r on the main bearing cap 321r.

Although the main bearing cap construction of the invention is described and shown in the context of a dual-crankshaft, opposed-piston engine embodiment with a single cylinder, this is for illustration only and is not intended to be limiting. It should be manifest that the construction principles of the invention are applicable to an opposed-piston engine of the dual-crankshaft type with one cylinder, two cylinders, three cylinders, or four or more cylinders. Thus the invention is applicable to an opposed-piston engine with two crankshafts, at least one cylinder, and at least four main bearings in which at least two main bearings support a first crankshaft of the two crankshafts and at least two main bearings support a second crankshaft of the two crankshafts.

The scope of patent protection afforded the novel apparatus, systems, and methods described and illustrated herein may suitably comprise, consist of, or consist essentially of a main bearing cap configuration for use in a uniflow scavenged opposed-piston engine that includes two crankshafts connected by a gear train which is provided in some implementations. Further, the novel apparatus, systems, and methods disclosed and illustrated herein may suitably be practiced in the absence of any element or step which is not specifically disclosed in the specification, illustrated in the drawings, and/or exemplified in the embodiments of this application. Moreover, although the invention has been described with reference to the presently preferred embodiment, it should be understood that various modifications can be made without departing from the spirit of the invention. Accordingly, the invention is limited only by the following claims.

What is claimed is:

1. An opposed-piston internal combustion engine, comprising:
    a cylinder block with a front face and a rear face;
    an intake crankshaft positioned on an intake end of the cylinder block and an exhaust crankshaft positioned on an exhaust end of the cylinder block;
    a gear train supported on the rear face of the cylinder block and connecting the intake crankshaft with the exhaust crankshaft;
    a first intake main bearing on the intake end of the cylinder block and a second intake main bearing on the intake end of the cylinder block, the first and second intake main bearings configured to support the intake crankshaft for rotation, the second intake main bearing located closer to the gear train than the first intake main bearing; and
    a first exhaust main bearing on the exhaust end of the cylinder block and a second exhaust main bearing on the exhaust end of the cylinder block, the first and second exhaust main bearings configured to support the exhaust crankshaft for rotation, the second exhaust main bearing located closer to the gear train than the first exhaust main bearing;
    in which each main bearing comprises a cap and a cylinder block portion, and in which the first intake main bearing cap and the first exhaust main bearing cap have a different configuration to that of the second intake main bearing cap and the second exhaust main bearing cap.

2. The opposed-piston engine of claim 1, wherein:
    the first intake main bearing cap configuration comprises two bolts for securing the first intake main bearing cap to the cylinder block;
    the first exhaust main bearing cap comprises two bolts for securing the first exhaust main bearing cap to the cylinder block;
    the second intake main bearing cap configuration comprises four bolts for securing the second intake main bearing cap to the cylinder block; and
    the second exhaust main bearing cap comprises four bolts for securing the second exhaust intake main bearing cap to the cylinder block.

3. The opposed-piston engine of claim 2, wherein:
    the four bolts of the second intake bearing cap configuration are arranged in a cross-bolted configuration; and
    the four bolts of the second exhaust bearing cap configuration are arranged in a cross-bolted configuration.

4. The opposed-piston engine of claim 3, wherein the second intake main bearing cap and the second exhaust main bearing cap each comprises side flanges for receiving two of the four bolts.

5. The opposed-piston engine of claim 4, wherein the second intake main bearing cap and the second exhaust main bearing cap each comprise side flanges for receiving two of the bolts of the four bolts in the cross-bolted configuration, the two bolts each perpendicular to a longitudinal axis of the at least one cylinder and a longitudinal axis of an adjacent crankshaft, the adjacent crankshaft being the intake crankshaft for the second intake main bearing cap and the adjacent crankshaft being the exhaust crankshaft for the second exhaust main bearing cap.

6. The opposed-piston engine of claim 5, wherein the side flanges on the second intake main bearing cap forms part of an interface surface of the second intake main bearing cap and the side flanges on the second exhaust main bearing cap forms part of the interface surface of the second exhaust main bearing cap, each main bearing cap comprising a interface surface that is on either side of the bearing surface, the interface surface contacting the cylinder block when the engine is in use.

7. The opposed-piston engine of claim 1, wherein the second intake main bearing cap configuration and the second exhaust intake main bearing cap configuration each comprises two sets of two bolts, further wherein a first set of two bolts comprises bolts that are fitted through the main bearing cap and cylinder block in a parallel configuration; and
    a second set of two bolts comprises bolts that are inserted through the cylinder block into the at least one main bearing such that each bolt in the second set of two bolts is perpendicular to a longitudinal axis of the at least one cylinder and a longitudinal axis of an adjacent crankshaft, the adjacent crankshaft being the intake crankshaft for the second intake main bearing cap and the adjacent crankshaft being the exhaust crankshaft for the second exhaust main bearing cap.

8. The opposed-piston engine of claim 7, wherein the second intake main bearing cap and the second exhaust main bearing cap each comprise side flanges for receiving the second set of two bolts.

9. The opposed-piston engine of claim 8, wherein each side flange comprises a height and a width that accommodate one bolt of the second set of bolts.

10. An opposed-piston internal combustion engine, comprising:
    a cylinder block with a front face and a rear face;
    an intake crankshaft positioned on an intake end of the cylinder block and an exhaust crankshaft positioned on an exhaust end of the cylinder block;
    a gear train supported on the rear face of the cylinder block and connecting the intake crankshaft with the exhaust crankshaft;
    a first intake main bearing on the intake end of the cylinder block and a second intake main bearing on the intake end of the cylinder block, the first and second intake main bearings configured to support the intake crankshaft for rotation, the second intake main bearing located closer to the gear train than the first intake main bearing; and
    a first exhaust main bearing on the exhaust end of the cylinder block and a second exhaust main bearing on the exhaust end of the cylinder block, the first and second exhaust main bearings configured to support the exhaust crankshaft for rotation, the second exhaust main bearing located closer to the gear train than the first exhaust main bearing;

in which each main bearing comprises a cap and a cylinder block portion, and in which the first intake main bearing cap and the second intake main bearing cap have a different configurations.

11. The opposed-piston internal combustion engine of claim 10, wherein the first intake main bearing cap comprises an arched beam that joins latterly-disposed ends with bolt openings on either side of a bearing opening and a set of two bolts, each bolt fitting through one bolt opening and fitting into an opening in the cylinder block, and further wherein the second intake main bearing cap comprises a first set of two bolts and a second set of two bolts in which the first set and second set of bolts are arranged in a cross-bolted configuration.

12. The opposed-piston engine of claim 11, wherein the first and second sets of bolts arranged in a cross-bolted configuration comprises a first set of two bolts comprises bolts that are configured to be fitted through the main bearing cap and the cylinder block in a parallel configuration.

13. The opposed-piston engine of claim 12, wherein second set of two bolts comprises blind bolts that are configured to be inserted through the cylinder block into the main bearing such that each bolt in the second set of two bolts is perpendicular to a longitudinal axis of a cylinder in the opposed-piston engine and also perpendicular to an insertion direction of the first set of two bolts.

14. The opposed-piston engine of claim 13, wherein the second set of bolts is also perpendicular to a longitudinal axis of the intake crankshaft.

15. The opposed-piston engine of claim 10, wherein the gear train comprises at least a first gear attached to the first crankshaft, a second gear attached to the second crankshaft, and an idler gear between the first and second crankshafts.

16. A crankshaft and bearing combination for use in a dual-crankshaft opposed-piston engine, the combination comprising:

a first crankshaft with a first end and a second end;

a first main bearing configured to support the first end of the first crankshaft;

a second main bearing configured to support the second end of the first crankshaft;

wherein the first end of the first crankshaft is configured to be adjacent to a gear train connecting the first crankshaft to a power take-off shaft when the first crankshaft is in use in an opposed-piston engine, the first main bearing configured to be adjacent to a gear train connecting the first crankshaft to a second crankshaft in addition to the power take-off shaft when in use.

17. The crankshaft and main bearing combination of claim 16, wherein the first main bearing comprises a main bearing cap that comprises protruding portions, one protruding portion each on either side of a bearing surface in the main bearing cap, the protruding portions configured to receive bolts.

18. The crankshaft and main bearing combination of claim 17, wherein the protruding portions are located along an interface surface of the main bearing cap, such that the width of the protruding portions are included in a length of the interface surface of the main bearing cap.

19. The crankshaft and main bearing combination of claim 17, wherein the main bearing comprises a bearing surface with a first portion of the bearing surface that is part of a main bearing cap and a second portion of the bearing surface that is part of a cylinder block.

20. The crankshaft and main bearing combination of claim 19, wherein, in use, a force exerted on the first main bearing is exerted in an arc that spans parts of the first and second portions of the bearing surface.

\* \* \* \* \*